US012746541B2

(12) United States Patent
Fritschi et al.

(10) Patent No.: US 12,746,541 B2
(45) Date of Patent: Sep. 29, 2026

(54) MULTI-CHANNEL PIPETTING HEAD

(71) Applicant: Tecan Trading AG, Männedorf (CH)

(72) Inventors: Lukas Fritschi, Schmerikon (CH); Andrea Marending, Zürich (CH)

(73) Assignee: TECAN TRADING AG, Männedorf (CH)

( * ) Notice: Subject to any disclaimer, the term of this patent is extended or adjusted under 35 U.S.C. 154(b) by 757 days.

(21) Appl. No.: 18/086,362

(22) Filed: Dec. 21, 2022

(65) Prior Publication Data

US 2023/0241600 A1 Aug. 3, 2023

(30) Foreign Application Priority Data

Dec. 23, 2021 (EP) .................................... 21217461

(51) Int. Cl.
*B01L 3/02* (2006.01)

(52) U.S. Cl.
CPC ....... *B01L 3/0279* (2013.01); *B01L 2200/023* (2013.01); *B01L 2200/04* (2013.01); (Continued)

(58) Field of Classification Search
CPC ............. B01L 3/0279; B01L 2200/023; B01L 2200/04; B01L 2200/0689; B01L 2300/0829
See application file for complete search history.

(56) References Cited

U.S. PATENT DOCUMENTS

| | | | |
|---|---|---|---|
| 9,333,499 | B2 | 5/2016 | Bolliger |
| 10,898,892 | B2 | 1/2021 | Guzman et al. |

(Continued)

FOREIGN PATENT DOCUMENTS

| | | |
|---|---|---|
| EP | 3 613 507 | 2/2020 |
| EP | 3 666 379 | 6/2020 |
| JP | 2012-247201 | 12/2012 |

OTHER PUBLICATIONS

CyBio Well Vario-multichannel automated pipetting system, Retrieved from: https://www.analytik-jena.us/products/liquid-handling-automation/high-throughput-liquid-handling/multichannel-automated-pipette-cybio-well-vario/ (Year: 2021).*

(Continued)

*Primary Examiner* — Charles Capozzi
*Assistant Examiner* — Alex Ramirez
(74) *Attorney, Agent, or Firm* — NIXON & VANDERHYE P.C.

(57) ABSTRACT

A multi-channel head of a liquid handling apparatus for aspirating and dispensing a metered amount of liquid is configured to attach an array of disposable tips in a pick-up action, in which the multi-channel head is lowered relative to the disposable tips so as to insert each connector into an internal passageway of a corresponding disposable tip by an amount sufficient to bring an upper collar of the disposable tips into contact with an underside of the alignment plate which in turn deforms the elastomeric seal against the tip internal passageway so as to form a sealing contact therewith. An alignment action is thereafter performed in which the alignment plate is moved relative to connectors by an amount sufficient to close any gap between the underside of the alignment plate and the upper surface of the tip collars that arises due to e.g., relaxation of the deformed seals.

13 Claims, 5 Drawing Sheets

(52) U.S. Cl.
CPC .................. *B01L 2200/0689* (2013.01); *B01L 2300/0829* (2013.01)

(56) References Cited

U.S. PATENT DOCUMENTS

| | | | | |
|---|---|---|---|---|
| 2011/0296931 | A1* | 12/2011 | Warhurst | B01L 3/0234 73/864.01 |
| 2019/0314808 | A1 | 10/2019 | Wilmer | |
| 2022/0097038 | A1* | 3/2022 | Wilmer | B01L 3/0275 |

OTHER PUBLICATIONS

The CyBio Well Vario Pipetting Head 1536/8 uL; Retrieved from: https://www.analytik-jena.fr/fileadmin/content/pdf_lab_automation/01_Produkte_LA/CyBio_Well_Vario/fl_1536_Pipetting_Head_en.pdf. (Year: 2018).*

* cited by examiner

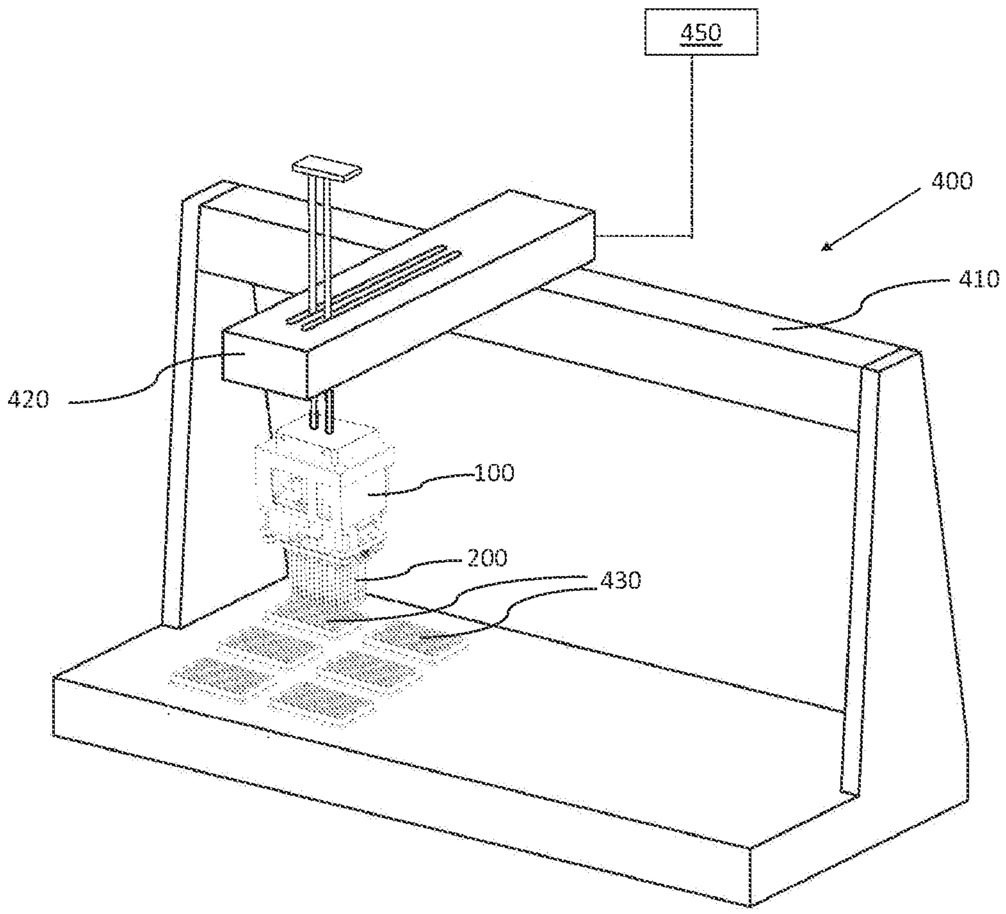
Fig. 4
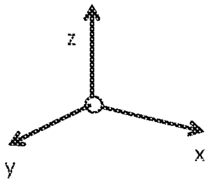

MULTI-CHANNEL PIPETTING HEAD

CROSS-REFERENCE TO RELATED APPLICATIONS

This application claims priority to EP patent application Ser. No. 21/217,461.9 filed Dec. 23, 2021, the entire contents of which are hereby incorporated by reference.

FIELD OF THE INVENTION

The invention relates to a multi-channel head of a liquid handling apparatus for picking up array of disposable tips, dispensing a metered amount of liquid therewith and then detaching the disposable tips after use. The multi-channel head includes a movable plate through which an array of connectors extend, whereby the plate is driven by a separate actuator and is used as a backstop when picking up the disposable tips.

BACKGROUND ART

An example of a device with such a moveable plate is known from US 2019/0314808. The device comprises a carrier having parallel attachments that extend through the moveable plate. Each attachment is adapted to fit in a pipette tip opening and has a tube with a supporting protrusion, an O-ring surrounding the tube, and a sleeve that is axially movable on the tube between a release position and a clamping position in which the sleeve compresses and expands the O-ring. The device comprises a $1^{st}$ displacement mechanism for displacing a push plate in axial direction, which in turn acts on the sleeve of each attachment. The moveable plate through which the attachments extend also serves as an ejector plate and is driven by a $2^{nd}$ displacement mechanism for moving said plate between a stop position and an ejection position. The second displacement mechanism has rocker arms pivotably mounted on the carrier, transmission shafts that are coupled to the sleeves, and ejection shafts which are securely connected to the ejector plate.

Disposable tips are picked up by thrusting the attachments into an opening in the tip, when the stop plate is in a stop position and serves as backstop. The push plate is then actuated to displace the sleeves to the clamping position, in which the O-rings are expanded in order to securely clamp the disposable tips to the attachments. A disadvantage of such a system comprising attachments with actuatable elements is that an additional actuator is required, thereby increasing the complexity of the apparatus.

A pipette tip coupler is known from U.S. Pat. No. 10,898,892, which also makes use of an expandable O-ring. The coupler is configured for use with specialised disposable tips, which comprise an annular groove into which the O-ring is expanded. The advantage of such a combination is that the disposable tips are not only securely clamped, but are also precisely aligned in axial direction.

It is an object of the invention to provide a multi-channel head device of straightforward construction that can reliably pick up an array of disposable tips, and is furthermore configured to ensure precise alignment of the disposable tips during use.

SUMMARY OF THE INVENTION

The present invention resides in a multi-channel head device of a liquid handling apparatus for aspirating and dispensing a metered amount of liquid via an array of disposable tips. The head device further comprises a carrier plate on which an array of connectors are arranged for picking up the correspondingly arranged array of disposable tips. A peripheral end of each connector is provided with a seat on which an elastomeric seal is arranged that surrounds an outer circumference of the connector. The device further comprises an alignment plate having an array of openings through which the connectors extend, and a linear displacement mechanism for moving the alignment plate in a direction z, parallel to a centre axis of the disposable tips, relative to the connectors. The head device is further equipped with a motor for driving the linear displacement mechanism and a controller, in communication with the motor, for controlling the position of the alignment plate in z-direction. The head device is configured to attach the array of disposable tips in a pick-up action, in which the alignment plate is in a stop position and the disposable tips are attached to the respective connectors by inserting the connectors into an internal passageway of the disposable tips by an amount sufficient to bring an upper collar of the disposable tips into contact with an underside of the alignment plate, whereby said insertion deforms the elastomeric seal against the disposable tip internal passageway so as to form a sealing contact therewith.

According to the invention, the controller of the multi-channel head device is programmed such that once the pick-up action is complete, an alignment action is performed in which the linear displacement mechanism moves the alignment plate in z-direction, relative to the connectors, by a first amount which is sufficient to close any gap between the underside of the alignment plate and the upper collar of the disposable tips, which exists due to relaxation of the deformed elastomeric seals or due to small positional variations in z-direction when the disposable tips are picked up from a holder.

The alignment action is a precision movement of e.g. 0.1-2.0 mm which ensures that during use of the disposable tips, the upper collar of each tip is in contact with the underside of the alignment plate. The disposable tips are precision-manufactured such that the collar upper surface is precisely perpendicular to the centre axis, meaning that when there is contact between plate underside and the collar surface, an orifice of each tip, through which liquid is aspirated and dispensed, is in alignment with the orifices of other disposable tips not only in z-direction (vertical direction), but also in longitudinal direction x and transverse direction y.

The apparatus of the invention thus enables tip pick-up and alignment without the need for a mechanism that directly acts on the seal to compress and deform it after the connectors have been inserted into the internal passageway of the corresponding disposable tips.

In an advantageous embodiment, the alignment plate also serves as an ejection plate and the controller of the head device is further programmed to execute a release action in which the disposable tips are detached by actuating the linear displacement mechanism, so as to displace the alignment plate relative to the connectors in z direction by a second amount that is sufficient to push off each disposable tip from the corresponding connector. The second amount of linear displacement associated with the release action is significantly greater than the first amount of linear displacement associated with the alignment action.

Prior to use, the disposable tips are typically supported on a holder such a tray having openings on which an underside of the tip collar rests. Suitably, the multi-channel head of the apparatus is moveable in x, y and z directions and, as part of the pick-up action, is moved to a position above the holder such that the array of connectors are aligned with the array of disposable tips. The dimensions and position of the disposable tips is precisely known and the apparatus is suitably configured to lower the head towards the holder, such that the connectors are inserted into the disposable tips. The head is lowered with the alignment plate in a stop position and there is no relative movement between the connectors and the alignment plate during the pick-up action. The distance by which the head is lowered is pre-programmed based on the known dimensions and position of the disposable tips, and is an amount which will, in principle, bring the underside of the alignment plate into contact with the upper surface of each disposable tip collar.

In practice, it can happen that due to the flexibility of the disposable tip holder and differences in relative stiffness between the centre of the holder and edges of the holder, not all disposable tips come into contact with the underside of the alignment plate during the pick-up action, leading to misalignment between the tips in z-direction and possibly also in x- and y-directions. Furthermore, as a result of the pick-up action in which the elastomeric seal of each connector is deformed so as to form a sealing contact with the disposable tip internal passageway, the deformed seal may subsequently relax, causing a movement of the disposable tip relative to its connector in z-direction. This further contributes to tip misalignment in z-direction and can also lead to tip misalignment in x- and y-directions when the extent of the relaxation is uneven and the upper surface of the collar is not parallel with the underside of the alignment plate.

Tip alignment in x and y direction is particularly important when the multi-channel head and attached disposable tips are configured for use with microplates having a large number of wells with a small centre-to-centre distance between adjacent wells, such as a 384-well microplate. Alignment in z-direction is also advantageous, as it minimises dead volume in reagent troughs and enables precision dispensing of liquid droplets in which the orifice of each disposable tip is arranged just above the bottom of an empty well, but is not in contact therewith. The liquid is dispensed slowly forming a droplet at the orifice of the disposable tip and contacting the bottom of the well. Subsequently, the multi-channel head retracts slowly putting the droplet down to the bottom of the well. This is sometimes referred to as contact dry dispensing.

As will be understood, the multi-channel pipetting head of the invention comprises a pipetting mechanism for aspirating and dispensing liquid via the disposable tips. In some embodiments, the pipetting mechanism comprises a cylinder block and an arrangement of pistons coupled to a piston plate. Typically, the piston plate is moveable in z-direction and may be connected to a spindle nut associated with two or more spindles. An electric motor may be provided to drive at least one of the spindles via a belt and pulley system. In other examples, the piston plate may be mounted on linear guides and driven by linear actuators. It is also possible for the multi-channel head to comprise an air-based pipetting mechanism whereby pipettors are connected to a source of vacuum/pressures in order to aspirate and dispense liquid.

A separate motor and a separate displacement mechanism are provided for automated movement of the alignment plate.

The precision downward movement of the alignment plate relative to the connectors, which constitutes the alignment action, is programmed to close any gap that exists after pick-up. The programmed distance is selected based on tests conducted using the multi-channel head, with the specific type of seals that are mounted to the connectors, in combination with the disposable tips and the holder that will be used to support them. As mentioned, the amount of the movement is small. In tests conducted using a 96-channel head and a tray holding 96 disposable tips, a suitable displacement of the alignment plate relative to the connectors for alignment purposes is approximately 0.6 mm. When the alignment plate is moved in the release action, a typical displacement is in the region of 10.0-15.0 mm.

The linear displacement mechanism that drives the alignment plate must therefore be capable of relatively large movements, as well as precise, small displacements. In a preferred embodiment, the alignment plate is supported relative to the carrier plate, which forms a fixed part of the multi-channel head, via an arrangement of first and second spindles or leadscrews. Each spindle is rotationally supported via first and second bearings and comprises a spindle nut which may be a ball screw, a roller screw, or plain spindle nut. The alignment plate is coupled to the spindle nut of each spindle arrangement, preferably via a number of rods that extend through the carrier plate. A peripheral end of each spindle extends beyond the carrier plate and is coupled to a pulley sheave. The second motor is mounted to a fixed part of the multi-channel head, whereby an output shaft of the second motor extends beyond the carrier plate and is likewise coupled to a pulley sheave. The pulley sheaves form part of a belt and pulley system for rotating the spindles via rotation of the driven pulley sheave. A geared arrangement is also possible. Other suitable types of linear actuator may also be used to move the alignment plate relative to the connectors.

The connectors that extend from the carrier plate have an internal channel and may be essentially cylindrical in shape or may be somewhat conical, tapering towards the peripheral end where the seat for the seal is arranged. Suitably, the seat is formed by a cylindrical portion which has a smaller diameter relative to sections of the connector at either side in z-direction, such that the seal is axially retained on the connector. In a preferred embodiment, the seal comprises a cylindrical part and a flange part, whereby the flange part deforms when a connector is pushed into a disposable tip. In other examples, the seal may be an O-ring or an X-profile ring. The seal may be made from any suitable elastomeric material, such as NBR (Nitrile Butadiene Rubber), EPDM (Ethylene Propylene Diene Monomer rubber), silicone rubber etc.

In some embodiments, the multi-channel head comprises an array of 96 connectors. In other embodiments, the multi-channel head comprises 384 connectors. In still further embodiments, the multi-channel head comprises 1536 connectors.

It will be appreciated by those skilled in the art that two or more of the above-mentioned embodiments, implementations, and/or aspects of the invention may be combined in any way deemed useful.

A multi-channel head according to the invention enables reliable and secure pick-up and precision alignment of disposable tips in a straightforward manner, without the need for a separate mechanism that acts directly on the seal. As a result of the accurate alignment, the multi-channel head may be used for precision dispensing of small amounts of e.g. 0.1 μL. These and other aspects of the invention are apparent from and will be elucidated with reference to the embodiments described hereinafter and with reference to the accompanying drawings.

BRIEF DESCRIPTION OF THE DRAWINGS

FIG. 4 is a perspective view of a liquid handling apparatus comprising an example of a multi-channel head device.

It should be noted that items which have the same reference numbers in different figures, have the same structural features and the same functions. Where the function and/or structure of such an item has been explained, there is no necessity for repeated explanation thereof in the detailed description.

DETAILED DESCRIPTION OF EMBODIMENTS

Figure 1A:
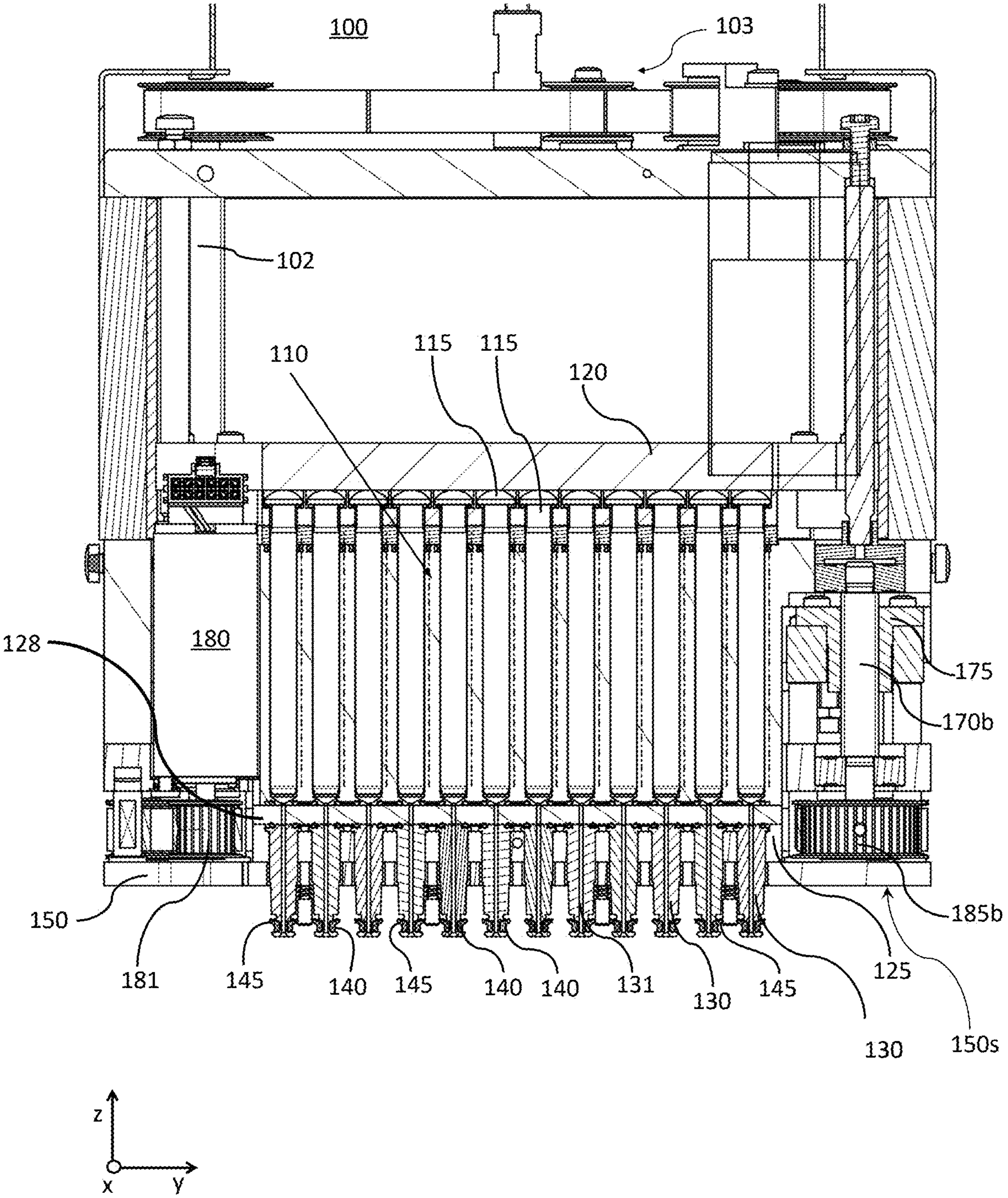
FIGS. 1*a* & 1*b* respectively show a front cross-sectional view and s side cross-sectional view of an embodiment of a multi-channel head according to the invention, for use in a liquid handling apparatus.
Figure 1B:
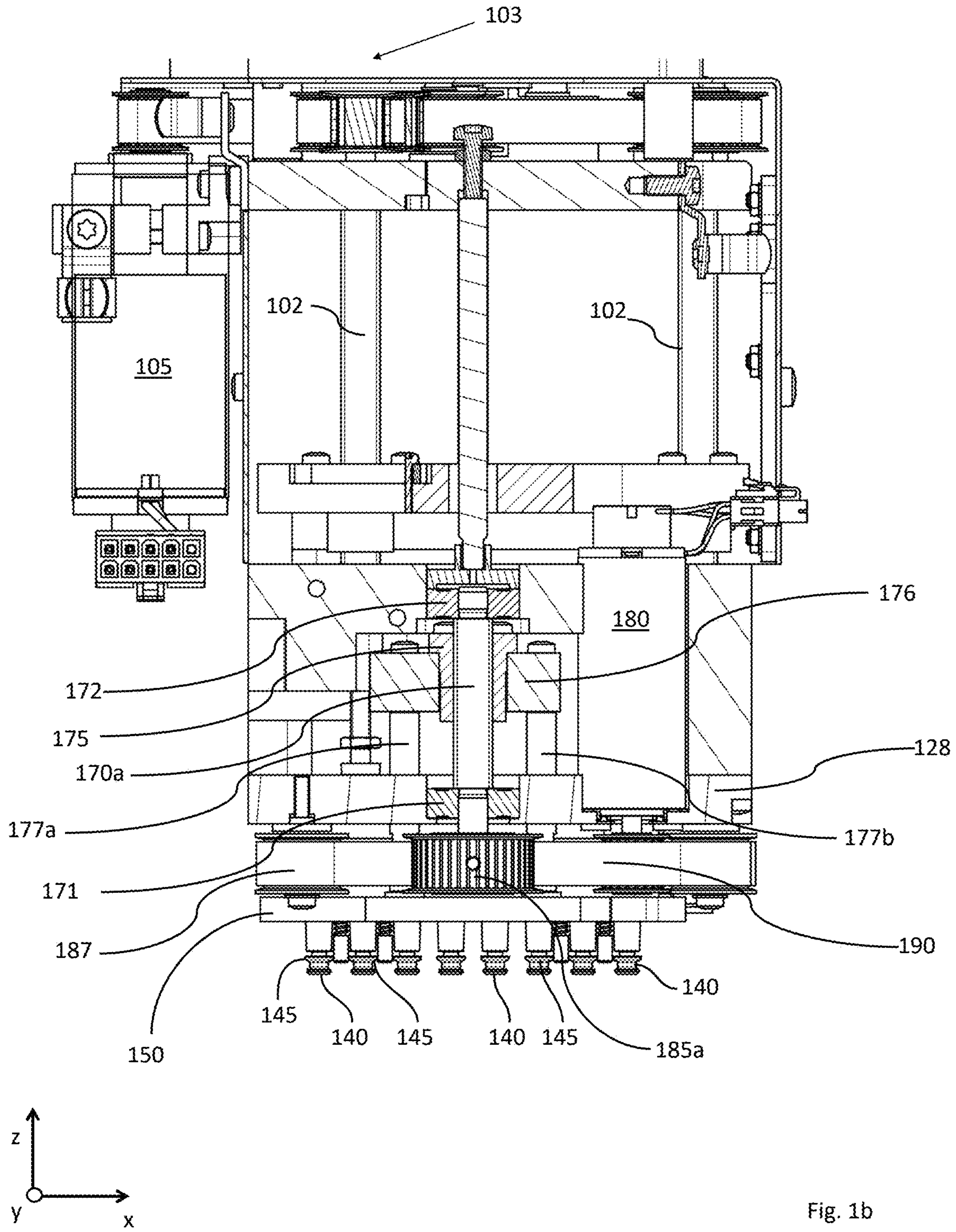
Figure 1C:
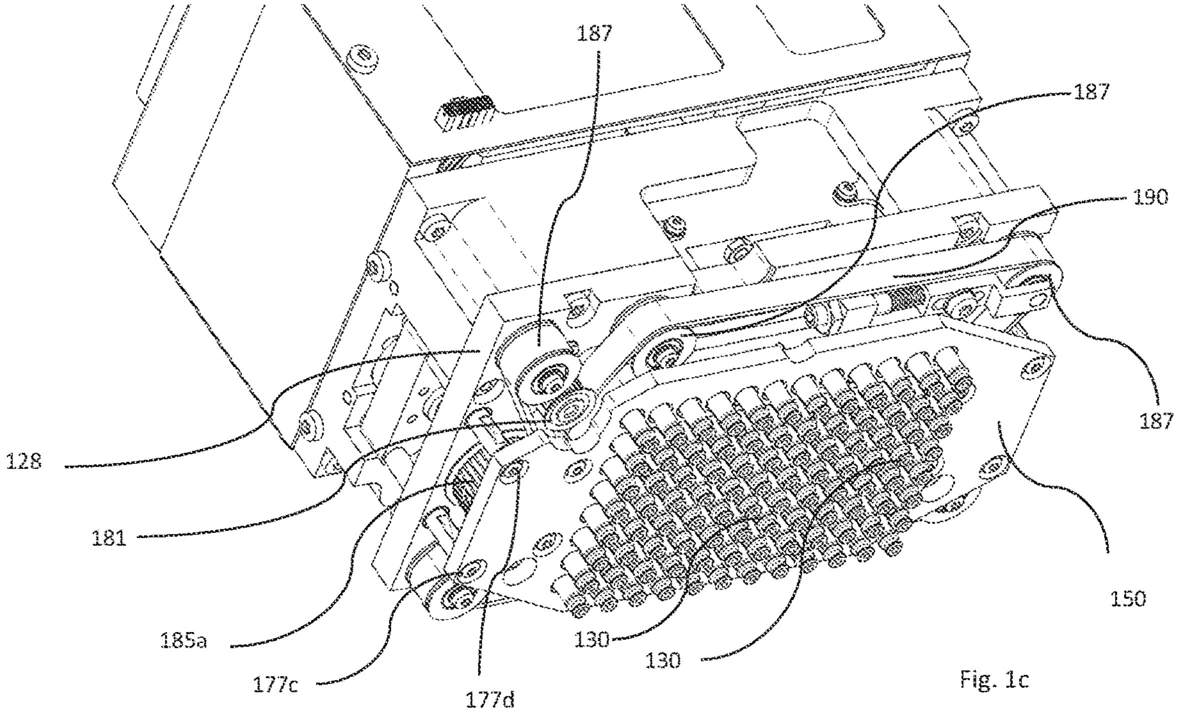
FIG. 1*c* is a perspective view of an underside of the multi-channel head shown in FIGS. 1*a* & 1*b;*

FIGS. 1*a*-1*c* show views of a multi-channel head device 100 according to an embodiment of the invention, which forms part of a liquid handling apparatus that may be used in a laboratory environment to dispense a metered amount of liquid via an array of disposable tips that are attached to individual connectors 130, arranged at an underside of the head device. Liquid is aspirated and then dispensed with the aid of a block of cylinders 110, each one equipped with a piston 115 that is connected to a piston plate 120. The piston plate is moveably coupled to a fixed part of the multi-channel head device via a first displacement mechanism, driven by a first motor 105 (refer FIG. 1*b*). In the depicted example, the first displacement mechanism comprises an arrangement of three spindles 102, which are driven in a known manner by a belt and pulley system (generally indicated with reference numeral 103).

Each connector 130 has an internal channel 131 that is in fluid communication with the cylinders 110. The connectors extend from a carrier plate 125 that is fixed to the device housing. The head device in the depicted example has a pipetting capacity of 1000 μL for each pipetting channel.

Figure 2A:
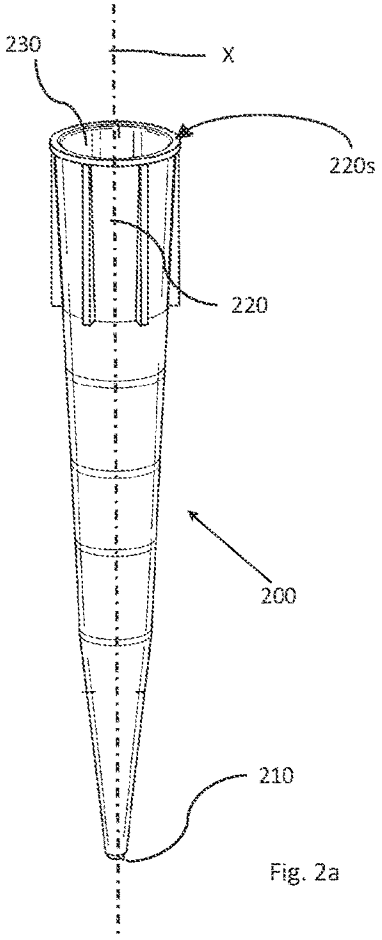
FIG. 2*a* is a perspective view of an example of a disposable tip for attachment to a connector of the multi-channel head.

An example of a disposable tip 200 is shown in FIG. 2*a*. The disposable tip has an orifice 210 at one end, through which liquid is aspirated and dispensed. A collar 220 is provided at the opposite end and the disposable tip has central passageway 230. The disposable tips are precision-manufactured, typically in an injection moulding process. An upper surface of the collar 220*s* is perpendicular to a centre axis X of the disposable tip and the tip 200 is rotationally symmetric about this axis. Therefore, when the upper surface 220*s* of the collar is in contact with a planar surface, the centre axis X of each disposable tip will be perpendicular to the planar surface.

Figure 2B:
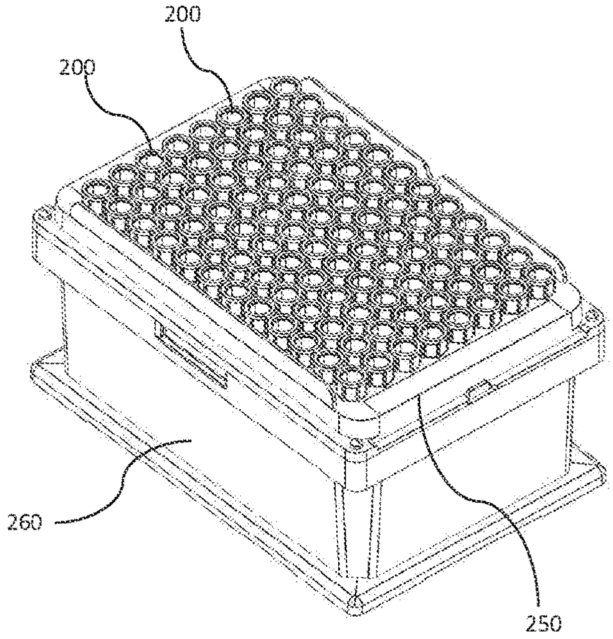
FIG. 2*b* is a perspective view of a holder for an array of disposable tips; schematically show a disposable tip being attached to a connector, FIG. 3*a*-3*c* which forms part of the multi-channel head, in stages of a pick-up action FIG. 3*d* schematically shows the disposable tip being aligned in an alignment action, after pick-up FIG. 3*e* schematically shows a disposable tip being detached from the connector, after use, in a release action.

Typically, an array of disposable tips 200 are held in a suitable tray 250 arranged in a box 260, such as shown in FIG. 2*b*. A top surface of the tray 250 has an array of openings, whereby an underside of the collar of each disposable tip 200 is supported on the tray top surface. The connectors 130 are arranged in a corresponding array and the disposable tips are attached by lowering the head device 100, such that each connector extends into the central passageway 230 of each disposable tip 200 and establishes a sealing connection therewith. Accordingly, a peripheral end of each connector has a seat that supports a radial seal 140 made of an elastomeric material such as NBR or other suitable elastomer. Suitably, the seat 135 (refer FIG. 3*a*) is formed by a cylindrical portion of the connector 130, which has a relatively smaller outer diameter than adjacent portions in the z-direction, such that the seal 140 is axially retained on the connector. After the array of disposable tips has been used, they are detached from their respective connectors 130 by a moveable plate 150 of the device 100 that is displaceable relative to the connectors 130 in vertical direction z.

As may be better seen in FIG. 1*c*, which shows a perspective view of the underside of the apparatus 100, the connectors 130 extend through corresponding openings in the moveable plate 150. In accordance with an embodiment of the invention, the moveable plate is not only used to detach the disposable tips from the connectors, but is additionally used for alignment of the tips after attachment. This will be explained in more detail with reference to FIGS. 3*a*-3*e* and the moveable plate 150 will be referred to as an alignment plate.

Figure 3A:
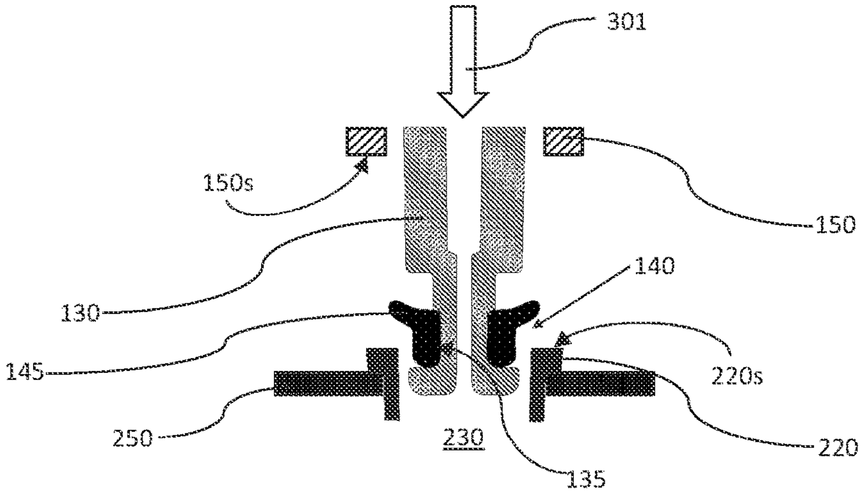

FIG. 3*a* schematically shows an individual connector 130 being lowered (indicated by arrow 301) into the internal passageway 230 of a disposable tip 200 having a collar 220 that is supported on an upper surface of a tray 250 that surrounds an opening in the tray. The dimensions and location of each disposable tip are precisely known and the connectors are lowered by an amount that should bring an upper surface 220*s* of the disposable tip collar 220 into contact with an underside 150*s* of the alignment plate 150. When the head device is lowered to pick up the array of disposable tips, there is no movement of the alignment plate 150 relative to the connectors 130. The alignment plate is in a stop position, and the plate underside 150*s* is intended to serve as a backstop for each disposable tip collar 220.

Figure 3B:
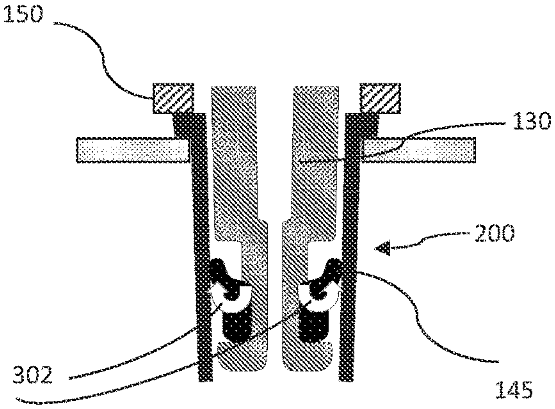

In the depicted example, the cylindrical seal 140 has an upper flange 145 with an outside diameter that is somewhat larger than an internal diameter of the disposable tip internal passageway 230. As shown in FIG. 3*b*, the flange part 145 of the seal deforms in the direction indicated by arrows 302 when the connector 130 is inserted into the internal passageway 230 and establishes a sealed connection. The attachment between each connector and the corresponding disposable tip is established purely by the frictional engagement between the seal flange 145 and the interior surface of the internal passageway 230.

Figure 3C:
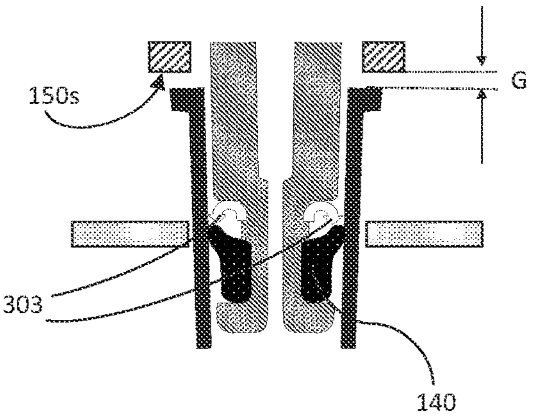

It can happen that the seal 140 relaxes after it has been deformed as indicated by the arrows 303 in FIG. 3*c*. Due to the frictional engagement between the seal and the interior of the internal passageway, this causes a displacement of the disposable tip and disposable tip collar 220 away from the plate underside 150*s* in vertical direction z, such that a gap G is created. It is possible for the created gap G to be different between different disposable tip collars, such that the orifices of the disposable tips are not in alignment in z-direction. Variations in the gap G in z-direction can also be attributable to the variable stiffness of the tray 250 that holds the disposable tips. When the connectors are inserted, it is possible for this to cause greater deformation in a central region of the tray that at the tray sides, such that the underside 150*s* of the alignment plate does not in fact serve as a backstop for all of the disposable tips during the initial pick-up action.

It is also possible for the created gap G to be uneven such that the upper surface 220*s* of a tip collar is not parallel to the plate underside 150*s*. This can lead to misalignment of the tip orifice in x- and/or y-direction relative to the centre axis X.

Figure 3D:
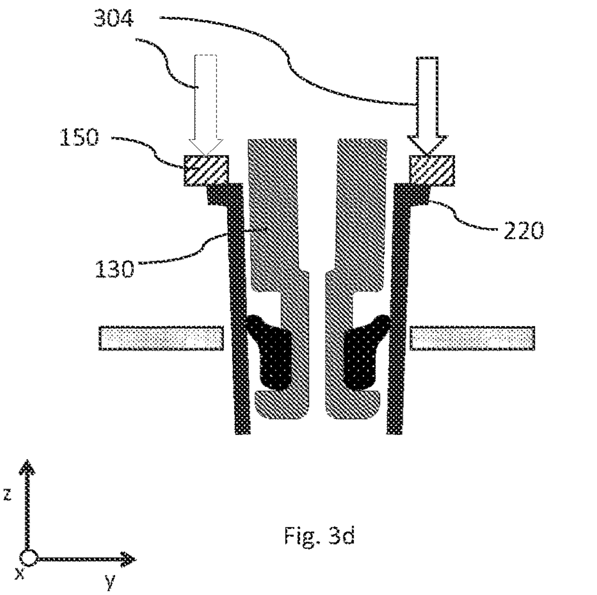

As shown in FIG. 3*d*, the apparatus of the invention is configured to close any created gap by moving the alignment plate 150 downward relative to the connectors 130 (as indicated by arrow 304), The amount of this first movement in vertical direction z is small, e.g. 0.1 mm to 2.0 mm, and is suitably calibrated based on tests performed with the multi-channel head and the tip support tray being used. In the depicted example, the amount of movement in the alignment action is approximately 0.6 mm. The downward movement brings the underside of the plate 150*s* into contact with the disposable tip collar 220, such that the orifice 210 of all attached disposable tips are in alignment with each other and are in alignment relative to the centre axis X.

As explained earlier, alignment in z-direction is advantageous for reducing dead volume, when aspirating liquid, and for contact dry dispensing of droplets. Alignment in x- and y-directions is important when the orifices of the disposable tips are inserted into a microplate, such as a 384-well microplate, whereby adjacent wells in the microplate have a relatively small centre-to-centre distance. The head depicted in the drawings is a 96-channel head. As a result of the alignment action, such a multi-channel head may be used with accuracy and reliability not only in combination with a 96-well microplate, but also in combination with a 384-well microplate.

In a further embodiment, the head includes 384 connectors and can be used in combination with a 384-well microplate and a 1156-well microplate.

Figure 3E:
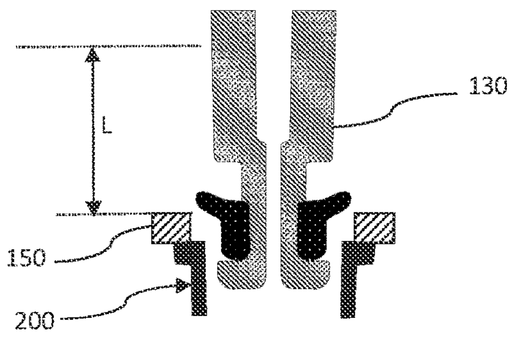

After use of the disposable tips, they are detached from the connectors 130 by a second, larger downward movement of the alignment plate 150 relative to the connectors 130, as shown in FIG. 3*e*. The plate 150 exerts an axial force on the upper surface 220*s* of the collar that is sufficient to overcome the frictional engagement between the seal 140 and the internal passageway 230 and the extent of the movement L in vertical direction z is sufficient to push off the disposable tip 200 from the connector 130. In the depicted example, the alignment plate is moved approximately 12 mm in the release action.

A preferred mechanism for actuating the alignment plate 150 will now be described. The alignment plate is supported relative to a housing of the device 100 via a first and a second spindle arrangement. The first spindle 170*a* is shown in FIG. 1*b*; the second spindle 170*b* is visible in FIG. 1*a*. Each arrangement is identical and will be described in detail with reference to the first arrangement. The first spindle 170*a* is rotationally supported by first and second bearings 171, 172, so as to be rotational about a vertical rotation axis. This first and second bearings 171, 172 may be e.g. a ball bearing whereby an outer ring of each bearing is mounted to a fixed part of the device and the inner ring is connected to the spindle 170*a*. The arrangement further comprises a spindle nut 175, which may be a ball screw, a roller screw or a plain spindle nut. The alignment plate 150 is fixedly connected to the spindle nut 175. In the depicted example, a first end of four rods 177*a*, 117*b*, 177*c*, 177*d* are connected to the alignment plate 150. The rods extend through a respective opening in a further plate of the device, which is known as an isolation plate 128, and a second end of the rods are fixedly attached to a collar part 176, which in turn is fixedly attached to the spindle nut 175. The spindle nut is unable to rotate, meaning that driven rotation of the spindle 170*a* causes linear translation of the spindle nut 175 and the attached alignment plate 150.

The rotational drive is provided by a second motor 180, together with a second belt and pulley system. The second motor 180 may be a DC motor or a stepper motor and is mounted on the isolation plate 128, whereby an output shaft of the motor extends through an underside thereof and is coupled to a first pulley sheave 181. The first and second spindles 170*a*, 170*b* extend through the isolation plate 128 and are likewise coupled to their own respective pulley sheave 185*a*, 185*b* which are rotated by a belt 190 of the pulley system. As will be understood, the pulley system comprises a number of suitably arranged idlers 187 mounted to the underside of the insolation plate 128 which interconnect the belt in a circuit that enables the spindle pulley sheaves 185*a* and 185*b* to be rotated by the driven pulley sheave 181.

An advantage of driving the spindles via a pulley and belt system is that the second displacement mechanism exhibits minimal backlash and is thus suitable for performing the precision alignment movement of the alignment plate.

An example of a liquid handling apparatus comprising an inventive multi-channel head device 100 is shown in FIG. 4. The apparatus 400 has a robotic arm 420 which is movable in x-direction relative to a frame 410 of the apparatus. The multi-channel head device 100 is mounted to the robotic arm via a system of actuators that enable the multi-channel head to be moved relative to the arm 420 in x- and z-directions. The apparatus 400 further comprises a controller 450, which may be external or integrated in the apparatus and is suitably programmed to control the position of the head device 100 such that an array of attached disposable tips 200 can be inserted into the wells of a multi-well microplate 430. The controller may also be configured to control the pipetting mechanism of the multi-channel head and to control the second motor 180 that drives the spindles 170*a*, 170*b* for displacing the alignment plate 150 of the device 100.

Suitably, the apparatus controller 450 is configured to execute steps of an inventive method of picking up and aligning an array of disposable tips using a multi-channel head device 100 comprising an array of connectors for receiving the disposable tips, whereby a peripheral end of each connector is provided with a seat 135 on which an elastomeric seal 140 is arranged that surrounds an outer circumference of the connector, and whereby the connectors 130 extend through an alignment plate 150 that is moveable relative to the connectors in z-direction. The method comprises steps of:

lowering the multi-channel head 100 in z-direction, with the alignment plate 150 in a stop position, so as to insert the connectors into an internal passageway 230 of the corresponding disposable tip 200, by an amount sufficient to bring the upper surface 220*s* of the tip collar 220 into contact with the underside 150*s* of the alignment plate, whereby said insertion deforms the elastomeric seal against the disposable tip internal passageway 230 so as to form a sealing contact therewith that provides the sole attachment force between each disposable tip and the respective connector;

raising the multi-channel head so as to pick up the array of disposable tips 200 and remove them from a holder 250 on which they are supported; and aligning the disposable tips by displacing the alignment plate 150 in z-direction, relative to the connectors 130, from the stop position by a first amount which is sufficient to close any gap G between the underside 150*s* of the alignment plate and the upper surface 220*s* of the tip collars, which exists due to relaxation of the deformed elastomeric seals 140 and/or due to small positional variations in z-direction when the disposable tips are picked up from the holder.

In an embodiment, the method comprises a further step of detaching each disposable tip from the corresponding connector 130 by displacing the alignment plate 150 in z-direction relative to the connectors 130 by a second amount, which is sufficient to push off the disposable tips 200 from the corresponding connectors. The first amount of displacement in the alignment action is significantly smaller than the second amount of displacement in the release action.

Examples, embodiments or optional features, whether indicated as non-limiting or not, are not to be understood as limiting the invention as claimed. It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

LIST OF REFERENCES AND ABBREVIATIONS

The following list of references and abbreviations is provided for facilitating the interpretation of the drawings and shall not be construed as limiting the claims.

100 multi-channel head device
102 spindles of 1st displacement mechanism
103 pulley drive of 1st displacement mechanism
105 1st motor
110 cylinder block
115 pistons
120 piston plate
125 carrier plate for connectors
128 isolation plate
130 connectors
131 internal channel through each connector
135 seat on connector for radial seal
140 radial seal
145 flange part of radial seal
150 alignment plate
150*s* lower surface of alignment plate
170*a*, 170*b* 1st & 2nd spindles of 2nd displacement mechanism
171, 172 1st and 2nd bearings for rotationally supporting each spindle
175 spindle nut
176 collar part fixed to spindle nut
177*a*-177*d* rods connecting alignment plate to collar part
180 2nd motor for driving 2nd displacement mechanism
181 pulley sheave attached to output shaft of 2nd motor
185*a*, 185*b* pulley sheave attached to end of 1st & 2nd spindles respectively
187 idlers
190 pulley belt
200 disposable tip
210 tip orifice
220 upper collar of disposable tip
220*s* upper surface of tip collar
230 internal passageway through disposable tip
250 tray for holding an array of disposable tips
260 box for supporting disposable tip tray
400 liquid handling apparatus
410 Frame part of apparatus
420 robotic arm
430 multi-well microplate
G gap between underside of alignment plate in stop position and upper surface of tip collar, after execution of the pick-up action
L displacement in z-direction of alignment plate from aligned position to a release position in which a disposable tip is pushed off a connector
z vertical direction
y transverse direction
x longitudinal direction (perpendicular to z and y)
X centre axis of a disposable tip

The invention claimed is:

1. A multi-channel head of a liquid handling apparatus for aspirating and dispensing a metered amount of liquid via an array of disposable tips each having a tip collar, the multi-channel head comprising:

an array of connectors for picking up the array of disposable tips, wherein a peripheral end of each connector includes a seat and an elastomeric seal which is arranged on the seat that surrounds an outer circumference of the connector;

an alignment plate that is moveable in a z-direction, parallel to a centre axis of the disposable tips, the alignment plate having a plurality of openings through which the connectors extend, and an underside that defines an alignment plane which is adapted to contact upper surfaces of the tip collars of each disposable tip during an alignment action to thereby align the upper surfaces of the tip collars along the alignment plane of the moveable alignment plate;

a motor and a linear displacement mechanism, driven by the motor, for moving the alignment plate in a z-direction relative to the connectors, and a controller for controlling the motor; wherein the multi-channel head is configured to attach the array of disposable tips to the array of connectors in a pick-up action, when the alignment plate is in a stop position, in which the multi-channel head is lowered relative to the disposable tips so as to insert each connector into an internal passageway of a corresponding disposable tip by an amount sufficient to bring the upper surface of a collar of the disposable tips into contact with the underside of the alignment plate, wherein the insertion of each connector deforms the elastomeric seal against the disposable tip internal passageway so as to form a sealing contact therewith that provides the sole attachment force between each disposable tip and the respective connector; and wherein the controller is programmed to cause an alignment action to be performed, once the pick-up action is complete, in which the linear displacement mechanism moves the alignment plate from the stop position by a first amount, which is sufficient to close any gap between the underside of the alignment plate and the upper surface of the tip collars, which exists due to relaxation of the deformed elastomeric seals and/or due to small positional variations in z-direction when the disposable tips are picked up from a holder and thereby align the upper surfaces of the tip collars along the alignment plane of the moveable alignment plate.

2. The multi-channel head of claim 1, wherein the controller is further programmed to execute a release action in which the linear displacement mechanism is actuated, so as to displace the alignment plate relative to the connectors by a second amount, greater than the first amount of linear displacement associated with the alignment action, that is sufficient to push off each disposable tip from the corresponding connector.

3. The multi-channel head of claim 1, wherein each seal comprises a cylindrical part and a flange part having a larger outside diameter than the cylindrical part of the seal that surrounds the outer circumference of the corresponding connector.

4. The multi-channel head of claim 1, wherein the linear displacement mechanism comprises first and second spindle arrangements, wherein the alignment plate is coupled to a spindle nut associated with each spindle arrangement.

5. The multi-channel head of claim 3, wherein the linear displacement mechanism further comprises a belt and pulley system in which:

an output shaft of the motor is coupled to a driven pulley sheave;

a peripheral end of each spindle is coupled to a corresponding pulley sheave; and a pulley belt connects said pulley sheaves such that the first and second spindles are rotated via the driven pulley sheave.

6. The multi-channel head of claim 1 comprising an array of 96 connectors.

7. The multi-channel head of claim 1, comprising an array of 384 connectors.

8. The multi-channel head of claim 1, comprising an array of 1536 connectors.

9. The multi-channel head of claim 1, further configured such that when the alignment action is performed, the underside of the alignment plate is displaced relative to the tip collars of the connectors by a first amount which lies between 0.1 and 2.0 mm.

10. A liquid handling apparatus comprising the multi-channel head of claim 1.

11. A method of picking up and aligning an array of disposable tips using the multi-channel head device of claim 1, wherein the method comprises the steps of:

(i) lowering the multi-channel head in z-direction, with the alignment plate in a stop position, so as to insert the connectors into an internal passageway of the corresponding disposable tip, by an amount sufficient to bring an upper surface of a collar of the disposable tips into contact with an underside of the alignment plate, whereby said insertion deforms the elastomeric seal against the disposable tip internal passageway so as to form a sealing contact therewith that provides the sole attachment force between each disposable tip and the respective connector;

(ii) raising the multi-channel head so as to pick up the array of disposable tips and remove them from a holder on which they are supported; and (iii) aligning the disposable tips by displacing the alignment plate in z-direction, relative to the connectors, from the stop position by a first amount which is sufficient to close any gap between the underside of the alignment plate and the upper surface of the tip collars, which exists due to relaxation of the deformed elastomeric seals and/or due to small positional variations in z-direction when the disposable tips are picked up from the holder.

12. The method of claim 11, further comprising a step of detaching each disposable tip from the corresponding connector by displacing the alignment plate in z-direction relative to the connectors by a second amount, greater than the first amount associated with the alignment action, which is sufficient to push off the disposable tips from the corresponding connectors.

13. The method of claim 11, wherein the first amount of displacement in z-direction, applied in the step of aligning, is calculated based on tests conducted using the multi-channel head, the array of disposable tips and associated holder.

* * * * *